Figure 1:
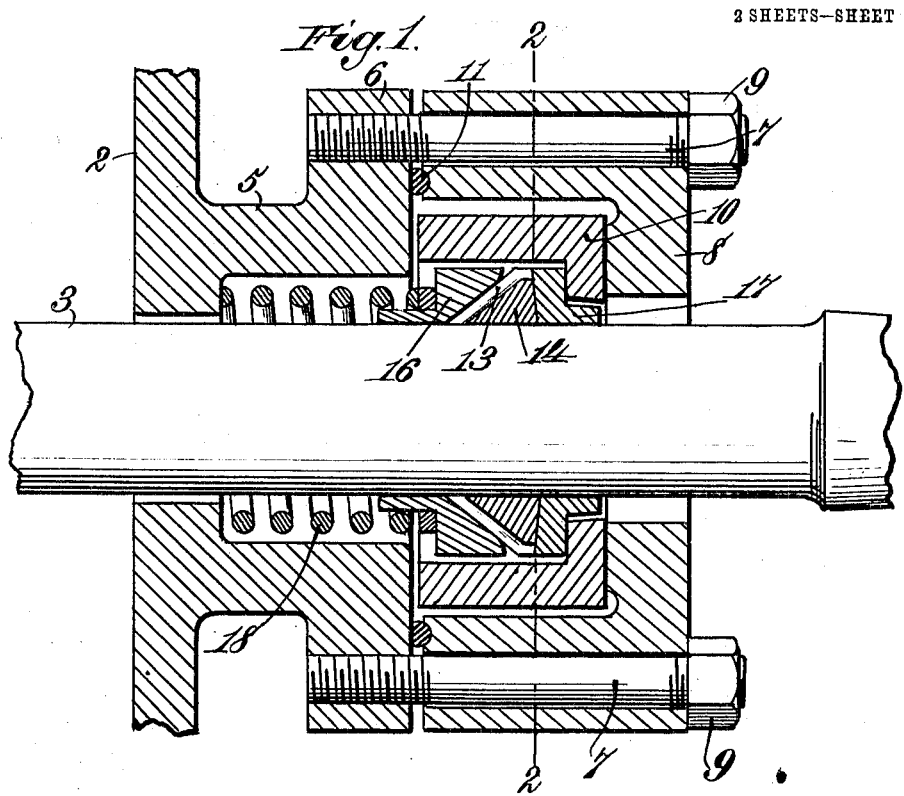

No. 871,068. PATENTED NOV. 12, 1907.
A. C. SCHAEFER.
PACKING FOR PISTON RODS.
APPLICATION FILED MAR. 1, 1907.
2 SHEETS—SHEET 2.
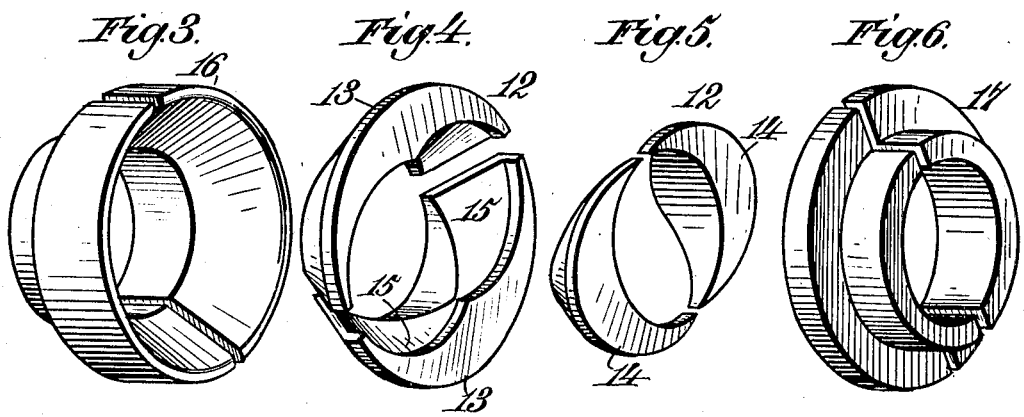
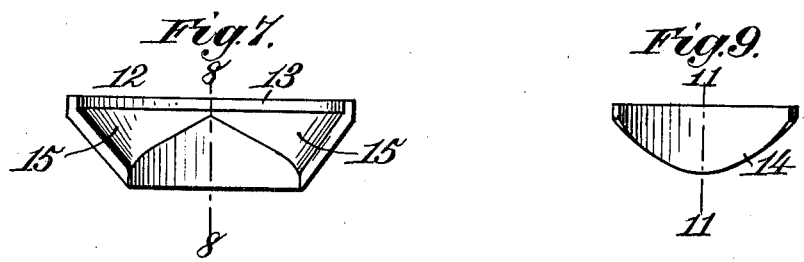
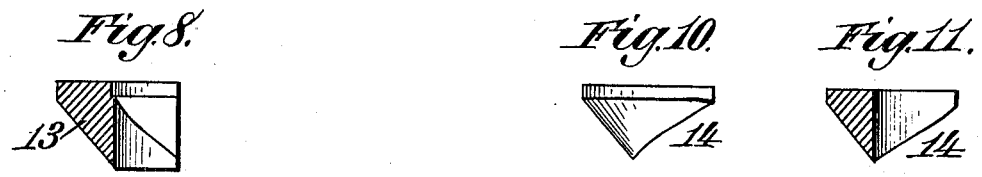
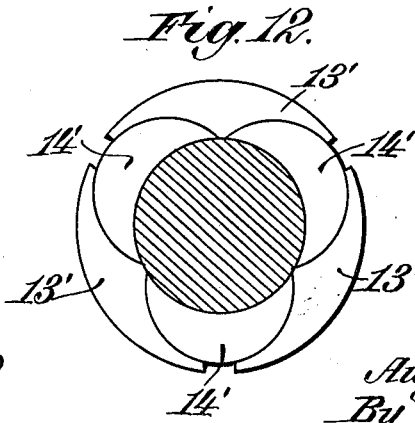
Witnesses.
Inventor.
August C. Schaefer.
By James L. Norris.
Atty.

UNITED STATES PATENT OFFICE.

AUGUST C. SCHAEFER, OF OELWEIN, IOWA, ASSIGNOR OF ONE-HALF TO WALTER P. CHRYSLER, OF OELWEIN, IOWA.

PACKING FOR PISTON-RODS.

No. 871,068.  Specification of Letters Patent.  Patented Nov. 12, 1907.

Application filed March 1, 1907. Serial No. 360,063.

*To all whom it may concern:*

Be it known that I, AUGUST C. SCHAEFER, a citizen of the United States, residing at Oelwein, in the county of Fayette and State of Iowa, have invented new and useful Improvements in Packing for Piston-Rods, of which the following is a specification.

This invention relates to what I shall for convenience term a packing for piston rods.

The packing is of primary importance when used in connection with a piston rod, although it may be utilized with advantage in other connections. Said packing is simple in construction, effective in action, has provision for compensating for wear, and presents the minimum friction; the device possesses other features of utility which with the foregoing will be set forth at length in the following description, the novelty of the invention appearing in the claims succeeding said description.

In the drawings accompanying and forming part of this specification I show in detail certain advantageous forms of embodiment of the invention which, to enable those skilled in the art, and for this purpose alone, to practice the invention, will be hereinafter described in detail.

Figure 2:
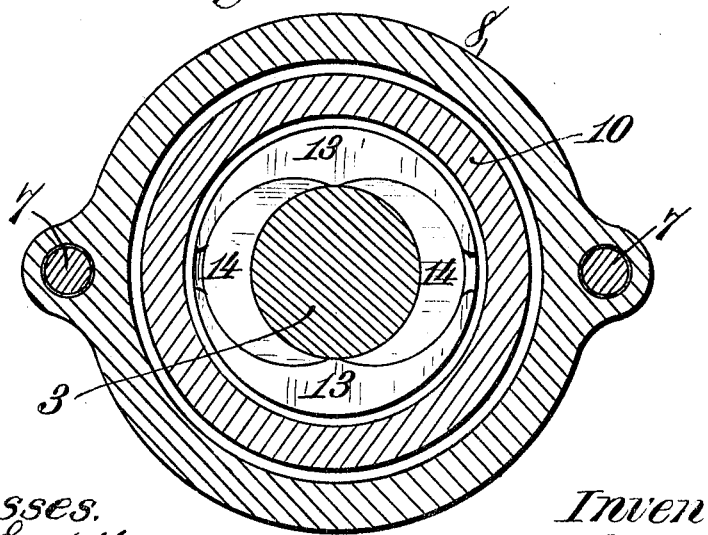

Referring to the drawings: Figure 1 is a longitudinal central sectional elevation of a portion of a cylinder, portion of a piston rod, and a packing involving my invention. Fig. 2 is a vertical section on the line 2—2 Fig. 1, looking toward the left in said Fig. 1. Figs. 3 to 6 are perspective views, Fig. 3 being a follower cone, Figs. 4 and 5 the segments of the packing proper separated, and Fig. 6 the reducing bushing. Fig. 7 is an inside face view of one of the segments of said packing proper. Fig. 8 is a cross section on the line 8—8 of Fig. 7. Fig. 9 is a view corresponding to Fig. 7 of one of the small segments of said packing proper. Fig. 10 is a side elevation of one of said small segments. Fig. 11 is a cross section on the line 11—11 of Fig. 9; and Fig. 12 is a detail view of a modified form of packing proper.

Like characters refer to like parts throughout the several figures.

The device includes in its make-up a packing proper which, for convenience, I will hereafter refer to simply as "the packing," and this I prefer to make of coneform in a plurality of segments. All of these segments may be of some soft composition metal, or one or more of them may be of some harder metal such as brass, cast iron, or the like. In Fig. 1 of the drawings I have shown in part a steam engine cylinder which will be designated by 2. In fact, in this particular figure I have shown but a portion of one of the heads of said cylinder, the piston not appearing. Through the head of said cylinder 2 is movable the piston rod 3 which extends outward through a boss as 5 on the said cylinder head and which has an annular external flange as 6 into which are tapped several bolts or screws as 7. I may employ but two of these bolts or screws as shown in both Figs. 1 and 2. These bolts or screws 7 serve as a' means for associating the gland 8 with the boss 5, they projecting through opposite lugs or ears on the gland, as shown clearly in Fig. 2. The screws or bolts are provided with nuts at their outer ends, which, when turned home, hold the cup-like gland on the two screws.
As usual, the rod 3 moves through a perforation or hole in the gland.

I prefer to dispose within the gland 8 a vibrating cup 10. The inner edge of said gland 8 is jammed solidly against the outer face of the boss 5 by the nuts 9. Preferably I place a packing 11 between the said gland and the boss 5, and this packing may be seated in an annular channel in the inner end of said gland. In this way I prevent leakage when the parts are subjected to a rocking motion as on a locomotive. This also provides for relative movement of certain parts hereinafter described incased in said gland.

The soft metal composition packing is denoted in a general way by 12, it consisting preferably of a number of segments which under the pressure of steam are caused to hug in a steam-tight manner the piston rod 3 which said packing 12 surrounds. The segments of said packing 12 are so related that, when they are operatively assembled, they present interiorly a cylindrical formation or one that is circular in cross section, as shown in Fig. 2, to conform to the cross sectional shape of the rod 3. Externally said packing 12 is of conical form, the reduced or small end facing the cylinder 2. The said packing 12 may be composed of any desirable number of sections, for example, four, as shown in Figs. 4 and 5, or six, as indicated in Fig. 12. The packing 12 shown in Figs. 4 and 5 consists of two large segments of duplicate construction, each designated by 13, the ends of which are shown as squared off and two smaller segments of similar construction, each denoted by 14, and all of them, as will be understood, taper externally from their outermost faces. The larger segments 13 have substantially spherical recesses as 15, and each of the smaller segments 14 fits at its outer ends in two opposite recesses 15, the fit being such that the inner faces of the several segments are brought into coincidence so as to present in effect a continuous circular wall which surrounds the rod 3. The smaller segments 14 are so fitted in the recesses 15 as to leave clearance spaces between the opposite ends of the larger segments 13, as clearly shown in Fig. 2, thereby to provide for taking up wear in said packing 12, caused by the action of the piston rod 3.

The packing 12 is preferably fitted in a follower cone as 16 shown in its operative relation in Fig. 1, and this follower cone 16, as illustrated in Fig. 3, I generally make in sections, although this is not essential. The character of the follower cone depends on the nature of the piston rod. Although the packing cone 12 fits within the follower cone only the external conical faces of the larger segments 13 of said packing cone come into contact with the conical inner face of the follower cone, as shown clearly in said Fig. 1. The outermost surface of the packing cone 12 is adapted to abut against the head of the reducing bushing 17, the shank of said bushing surrounding the rod 3 and fitting a perforation in the bottom of the vibrating cup 10. All the outer faces of the segments 13 and 14 are in a common plane so as to present practically a continuous surface which follows the shape of the adjacent face of the head of said reducing bushing 17.

I prefer to dispose within the boss or hub 5 a push spring as 18 bearing at its inner end against the cylinder 2 and at its outer end against the follower cone 16, and the latter may, as shown in Fig. 1, have a groove or channel to receive the outermost whirl or terminal portion of the coiled spring 18. Upon the introduction of pressure into the cylinder 2, such pressure acts against the follower cone 16 so as to thrust the same to the right in Fig. 1, said cone acting against the divided cone packing 12 and forcing the same solidly against the bushing 17 and at the same time constricting said packing 12 about the rod 3 so as to effectively prevent the passage of steam between said packing 12 and rod 3. On the exhaust of the cylinder, when the pressure is relieved from the follower cone 16 and naturally from the packing 12, the latter may expand to thereby permit free movement of the rod 3 when exhaust is taking place. There is no considerable tension in the spring 18; in fact, I prefer to have just enough tension in said spring so that said spring will serve to prevent the cone 16 and packing 12 following up the rod 3 during exhaust. During the operation of the piston under the action of steam the packing 12 is properly closed and tightly seated upon the rod, and I compensate for wear between the rod and packing and between the packing and follower cone. I may make the angle of the packing cone of small extent or pitch, so as to produce thin pliable portions, or feather, or knife edges at the inner ends of the segments of said cone packing, which close effectively upon the rod under pressure and promptly release said rod during exhaust. By virtue also of this feature there is no possibility of the cone packing wedging in the follower cone. As stated, the spring 18 is under small tension, this being sufficient only to prevent the said packing cone moving with the rod during exhaust, which is a feature of considerable importance in that the minimum of wear between the packing and rod is thus assured. I need provide also but a small bearing of the packing on the rod, and the cone end of the conical packing faces the cylinder thereby cutting off leakage more easily. When pressure is applied, the cone divides the force of the pressure between the inner face of the gland 8 and the rod 3. The outer face of the packing, as previously stated, is shaped to conform to the inner face of the head of the bushing 17, and this shape may be plain or curved.

The packing is simple in construction, can be inexpensively made, and prevents leakage.

In some cases, and as shown in Fig. 12, the divided cone packing may consist of more than four segments. In this figure I have shown said cone packing as consisting of three large segments 13′ and three small segments 14′, and one of these segments, for example one of the inner segments 14′, may be made from hard metal, such as brass or cast iron. I have mentioned one of several modifications.

What I claim is:

1. A piston rod packing comprising at least two small segments and at least two large segments, the larger segments having substantially spherical recesses and the smaller segments fitting in said recesses, the packing presenting interiorly a substantially continuous wall and being exteriorly of cone form.

2. A piston rod packing comprising at least two small segments and at least two large segments, the larger segments having recesses to receive the smaller segments, and the ends of the larger segments being squared off and separated from each other to provide clearance spaces, the segments mating to present internally a substantially continuous wall and being externally of conical form.

3. The combination of a cylinder, a piston rod extending through said cylinder, a divided conical packing around the said rod the reduced end of the packing facing the cylinder, fixed means against which the packing abuts when under the operation of steam pressure, and a follower cone between the cylinder and packing to receive the latter.

4. The combination of a cylinder, a piston rod extending through said cylinder, a divided conical packing around the said rod the reduced end of the packing facing the cylinder, fixed means against which the packing abuts when under the operation of steam pressure, a follower cone between the cylinder and packing to receive the latter, and a spring to act against the follower cone to prevent the packing moving with the rod during exhaust.

5. The combination of a cylinder, a piston rod projecting through the head of the cylinder, a divided conical packing surrounding the rod, a follower cone to receive said packing, and a vibrating cup provided with a bushing surrounding the rod and against which said packing abuts.

6. The combination of a cylinder, a piston rod projecting through the head of the cylinder, a divided conical packing surrounding the rod, a follower cone to receive said packing, a vibrating cup provided with a bushing surrounding the rod and against which said packing abuts, a coiled push spring surrounding the rod and acting against the cylinder and follower cone respectively, and a gland inclosing the vibrating cup and held to the cylinder in a steam-tight manner.

In testimony whereof I have hereunto set my hand in presence of two subscribing witnesses.

AUGUST C. SCHAEFER.

Witnesses:
G. A. KIDD,
T. E. KINT.